United States Patent
Ozeki et al.

(10) Patent No.: US 6,607,306 B2
(45) Date of Patent: Aug. 19, 2003

(54) RESIN FERRULE FOR USE IN OPTICAL FIBER CONNECTOR AND MOLDING DIE THEREFOR

(75) Inventors: Katsumi Ozeki, Tochigi-ken (JP); Keiji Takahashi, Tochigi-ken (JP); Hiroyuki Kobayashi, Tochigi-ken (JP); Norio Shinoki, Tochigi-ken (JP)

(73) Assignee: Daiichi Kasei Co., Ltd., Tochigi-ken (JP)

( * ) Notice: Subject to any disclaimer, the term of this patent is extended or adjusted under 35 U.S.C. 154(b) by 150 days.

(21) Appl. No.: 09/811,671

(22) Filed: Mar. 20, 2001

(65) Prior Publication Data

US 2002/0181889 A1 Dec. 5, 2002

(51) Int. Cl.$^7$ .................................................. G02B 6/38
(52) U.S. Cl. .............................. 385/78; 385/72; 385/60
(58) Field of Search ................................ 685/60, 72, 78

(56) References Cited

U.S. PATENT DOCUMENTS

| | | | | |
|---|---|---|---|---|
| 4,218,113 A | * | 8/1980 | Uberbacher | 385/72 |
| 4,490,006 A | * | 12/1984 | Lidholt | 385/78 |
| 4,789,216 A | * | 12/1988 | Schrott | 385/84 |
| 4,938,558 A | * | 7/1990 | Miller et al. | 385/72 |
| 5,375,183 A | * | 12/1994 | Edwards et al. | 385/60 |
| 5,450,514 A | * | 9/1995 | Hotea et al. | 385/87 |
| 5,778,125 A | * | 7/1998 | Busse et al. | 385/80 |
| 5,889,909 A | * | 3/1999 | Taira et al. | 385/78 |
| 5,905,830 A | * | 5/1999 | Chen et al. | 385/72 |
| 6,158,900 A | * | 12/2000 | Omiya et al. | 385/78 |
| 2002/0131720 A1 | * | 9/2002 | Chudoba et al. | 385/60 |

* cited by examiner

Primary Examiner—Robert H. Kim
Assistant Examiner—Krystyna Suchecki
(74) Attorney, Agent, or Firm—Birch, Stewart, Kolasch & Birch, LLP

(57) ABSTRACT

According to one aspect of the present invention, a resin ferrule, for use in an optical fiber connector, is provided including: a capillary 1 having an axial part 2; and a flange 13 protruding from the axial part 2; the ferrule having an optical fiber insertion hole 3 axially passing through the capillary 1. The capillary 1 and the flange 13 are integrated into a monolithic structure with thermoplastic resin. The capillary 1 has a planar-shaped front end surface 11, and a front end part 10 extending towards the front end surface 11, in a convergent fashion where the front end part 10 has the outer diameter of the radial cross-section thereof reduced along the axial direction thereof towards the front end surface 11 with the cross-section kept concentric. According to another aspect of the present invention, a die is provided for molding a resin ferrule, for use in an optical fiber connector, as defined above. The die has portions defining: a first cavity 21 for forming the capillary 1; a second cavity 22 for forming the flange 13; a core pin 25 for forming the optical fiber insertion hole 3; an internal hole pin 31 for forming the front end part 10 of the capillary 1; and a third cavity 23 for engaging with the internal hole pin 31. The internal hole pin 31 has a recess part 33 for forming the front end part 10 of the capillary 1, the recess part 33 being formed on an end surface of the internal hole pin 31 on the side facing the first cavity 21. The third cavity 23 has an internal circumferential surface 24, having a coating film 30, made of aluminum and titanium nitride, formed thereon. The internal hole pin 31 is engaged with the third cavity 23 by having the coating film 30 positioned therebetween. According to a further aspect of the present invention, the die has only a ring gate 40 as a gate, the ring gate 40 being disposed on an end surface 22a of the second cavity 22 on the side corresponding to the insertion opening 7 of the optical fiber insertion hole 3. With this arrangement, an excellent resin ferrule and a molding die therefor are obtained having advantages in that the ferrule is equipped with a highly increased precision, that the material and working costs of the ferrule are greatly reduced, that the ferrule has an outer diameter of high precision and is enabled to be mass produced stably, and that an optical fiber is kept free from any damage during its insertion into the ferrule.

4 Claims, 6 Drawing Sheets

RESIN FERRULE FOR USE IN OPTICAL FIBER CONNECTOR AND MOLDING DIE THEREFOR

FIELD OF THE INVENTION

The present invention relates to a ferrule, made of thermoplastic resin, integrated with a flange into a monolithic structure, for use in an optical fiber connector, and a molding die therefor.

BACKGROUND OF THE INVENTION

Because conventional ferrules for use in optical fiber connectors are precision parts, such ferrules are manufactured from materials, such as metals, ceramics, and polycrystalline glass, using highly advanced technology including machining, and are thereby expensive products. A ferrule consists of a capillary portion, or capillary, and a flange. As for the capillary, excluding the flange, the injection molding technique is already being utilized by using ceramics, such as zirconia, where it is assumed that the die for the molding is formed to have dimensions approximately 20% greater than the product dimensions of the ferrule, in consideration of shrinkage caused during the ceramic burning process, and that precision working is applied to the capillary after burning. On the other hand, in order for a ferrule to satisfy the performance characteristics required when an optical fiber connector is connected, dimensional accuracy in terms of 1 $\mu$m is necessary. When taking into consideration such parameters as the die accuracy, molding characteristics, and burning characteristics, however, it is extremely difficult to satisfy such level of dimensional accuracy, which thereby constitutes a major cause for high manufacturing cost.

Figure 7:
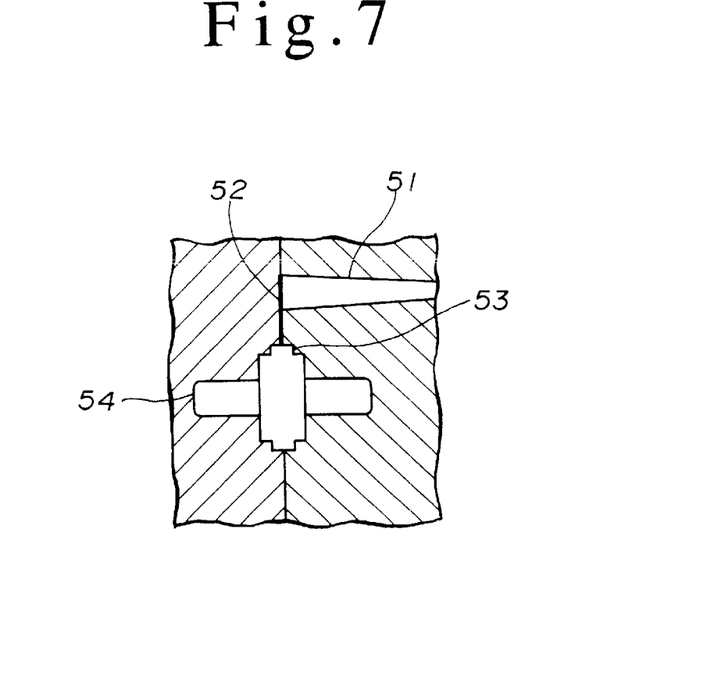
FIG. 7 depicts a schematic longitudinal sectional view showing a conventional die for molding a conventional resin ferrule.
Figure 8:
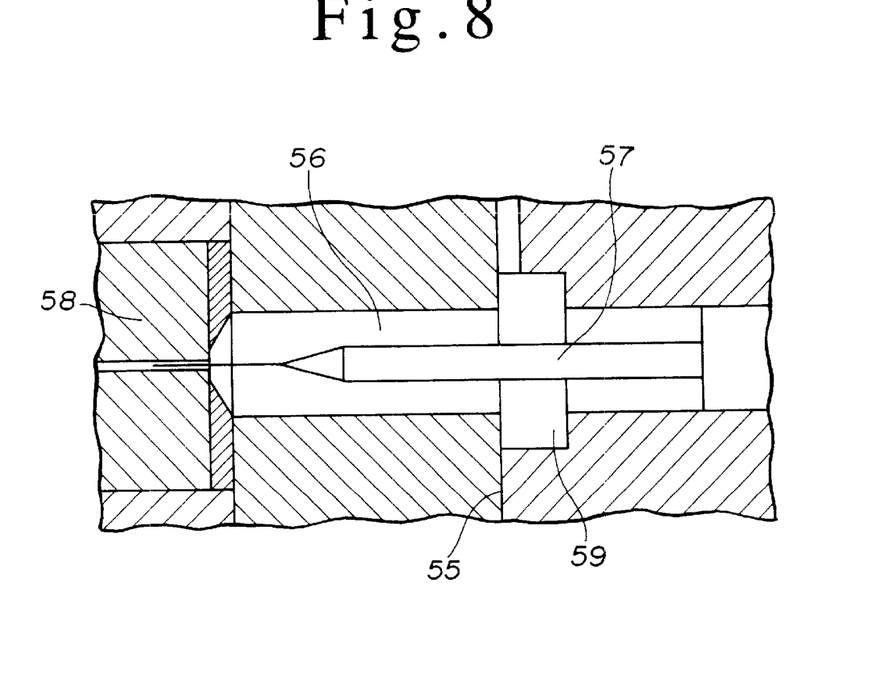
FIG. 8 depicts a partial longitudinal sectional view showing the molding die of FIG. 7, more in detail.

Therefore, to reduce the cost, developments and improvements of ferrules are in progress, including those for ferrules applied with injection molding, using thermoplastic resins. A die required for such injection molding may have a structure including a spool 51, a runner 52, a gate 53, and a cavity 54, as shown in FIG. 7, where a ferrule may be molded by casting molten resin into the die to flow through in this order. As shown in FIG. 8, this die is divisible at a parting line 55 into a stationary part fixed to the injection molding machine and a moving part movable in parallel with respect to the stationary part. The die has portions defining a cavity 56 for forming a capillary of the ferrule, and a core pin 57 for forming, in a connected structure, an optical fiber insertion hole including a guide hole part, a conical hole part, and a fine hole part, for inserting an optical fiber. The die also has a portion defining a cavity 58 for engaging with the core pin 57, and a cavity 59 for forming a flange of the ferrule.

Here, it should be noted that, in a ferrule for use in an optical fiber connector, particularly important points may include: the outer diameter of the ferrule; the eccentricity of the axial part of the capillary to the fine hole part of the optical fiber insertion hole; and the state of all the guide hole part, the conical hole part, and the fine hole part, of the optical fiber insertion hole being made free from any protrusions and dents, thereby these holes being arranged in smooth succession. The outer diameter and eccentricity may deeply affect the performance and characteristics of the ferrule when it is assembled into an optical fiber connector, while the smoothness of the optical fiber insertion hole may prevent a fatal defect of insertion failure from occurring.

In the injection molding of a conventional ceramic ferrule, as described above, a stainless steel flange is press fit onto the ceramic (e.g., zirconia) capillary. In this injection molding using ceramics, the die for the molding is formed to have dimensions approximately 20% greater than the product dimensions of the ferrule, and, thereafter, precision post-process working is applied to obtain a ferrule having the product dimensions. This may cause a disadvantage in that material and working expenses would amount high, thereby forcing the cost to rise, and the weight would also get heavier.

Furthermore, in the injection molding of a conventional ceramic ferrule, where die dimensions are greater than the finished product dimensions for machine working the molded parts, the molding die has been employing a construction where a core pin for forming an optical fiber insertion hole including a guide hole part, a conical hole part, and a fine hole part, is integrated into a monolithic structure, and the front end portion of this core pin is inserted into the insertion opening of the cavity for forming the front end surface of the ferrule, and such constructions has caused no problems. In the injection molding using thermoplastic resin, however, because a finished ferrule is formed exactly in the same dimensions as the die dimensions, the core pin 57 tends to break when inserted into the insertion opening of the cavity 58, if the gap between the core pin 57 and the insertion opening is narrow. Therefore, a relatively large gap is required between the core pin 57 and the insertion opening of the cavity 58, which may cause a problem in the eccentricity between the core pin 57 and the insertion opening of the cavity 58 increases, and the core pin 57 may be bent due to pressure fluctuation in the resin when molded. One method to solve the problem could be to divide the core pin 57 between the circular conical part and the straight pin part. This however tends to leave parting marks and level differences in the ferrule after molding, which in turn may cause a new problem in that, when an optical fiber is inserted, the optical fiber is caught by such parting marks and gets broken. Breakage may be particularly likely to occur because thermoplastic resin is softer than optical fiber. Therefore, it is required that the core pin 57 is by all means integrated into a monolithic structure, and concentricity is maintained with high accuracy.

In addition, when forming the axial part of the capillary of the ferrule with the cylindrical cavity 56, using a the thermoplastic resin, a problem may occur in that the front end part of the capillary is expanded to a trumpet-like shape as a result from the total effects of shrinkage and stretch due to quick cooling, pressure rise, and sink mark in the front end surface.

Moreover, when a gate for casting molten resin therethrough is connected to the flange of a complicated shape, fluctuations may occur in the flow and pressure of the molten resin when it passes through the complicated-shaped flange, which in turn may cause pressure fluctuation when the molten resin is cast into the cavity 56 for forming the axial part of the capillary. As a result, a problem occurs in that dispersion is caused to the roundness of the axial part of the capillary.

The present invention is made to solve the problems described above. Therefore, an object of the present invention is to provide a resin ferrule for use in an optical fiber that is capable of mass producing at low cost, reducing weight, preventing the front end part of the capillary from expanding to a trumpet-like shape, securing the roundness of the axial part of the capillary with high accuracy, and, furthermore, preventing eccentricity of the axial part to the optical fiber insertion hole, of the capillary from occurring, and to provide a proper molding die for such resin ferrule.

SUMMARY OF THE INVENTION

To solve the problems described above, inventors of the present invention have conducted tests on injection molding dies for various ferrules for use in optical fiber connectors since more than fifteen yeas ago. As a result, it has been known that, when a ring gate is employed, the outer diameter of the capillary of thermoplastic resin ferrules is correlated with the axial length, or width, of this gate, and the pressure preservation capability during the molding, and, thereby, specified dimensions of the targeted areas can be obtained by freely setting these correlated factors. Particularly, it has been found that, by having the flange of a complicated shape equipped with a ring gate of a very large axial width corresponding to ¼–½ the outer diameter of the capillary, fluctuations in the flow and pressure of molten resin can be smoothed that are caused by the molten resin flowing from the flange area of a complicated shape into a cavity for forming the capillary. This finding in turn has enabled to conduct highly precise control and stabilization of the outer diameter of the axial part of the capillary.

Also, because the effect of pressure preservation capability from the injection molding machine is outstanding, sink mark due to hourglass-shaped deformation can be prevented that is caused by inner diameter difference between the fine hole part and the guide hole part of the optical fiber insertion hole of the ferrule.

However, because the operation described above uses an axial gate width, close to the product wall thickness of the capillary that is completely different from an ordinary gate width, the operation tends to quickly raise the pressure of the molten resin at the front end surface of the ferrule, and thereby quickly cool the molten resin of a high temperature, which in turn tends to increase the trumpet-shaped deformation occurring in the front end part. Such gate design also may require a tremendous amount of time for the gate working as a post-molding processing. The inventors of the present invention have solved those problems by reducing the quick cooling in the front end surface (slow cooling at the center) and the pressure rise also in the front end surface through equipping a cavity for forming the front end part of the capillary with a concentric circular recess.

It has been also known that the shape of the front end part of the capillary affects the outer diameter of the capillary. However, because the pressure fluctuations within the cavity are smoothed, e.g., because the pressure from the resin to the core pin is applied uniformly in a concentric circular fashion, the trumpet-shaped deformation occurring in the front end part of the capillary has been reduced by equipping the recess in the cavity for forming the front end part of the capillary with a concentric circular shape, without deteriorating the roundness of the axial part of the capillary and the concentricity of the optical fiber insertion hole with the fine hole part. The recess in the cavity may be formed by using a proper shape, such as a spherical or chamfered one, as far as being within the scope of a concentric circular nature, also taking die fabrication easiness into consideration.

In addition, mass production has been made easy by having the ring gate positioned at a place that enables automatic gate processing.

Figure 5:
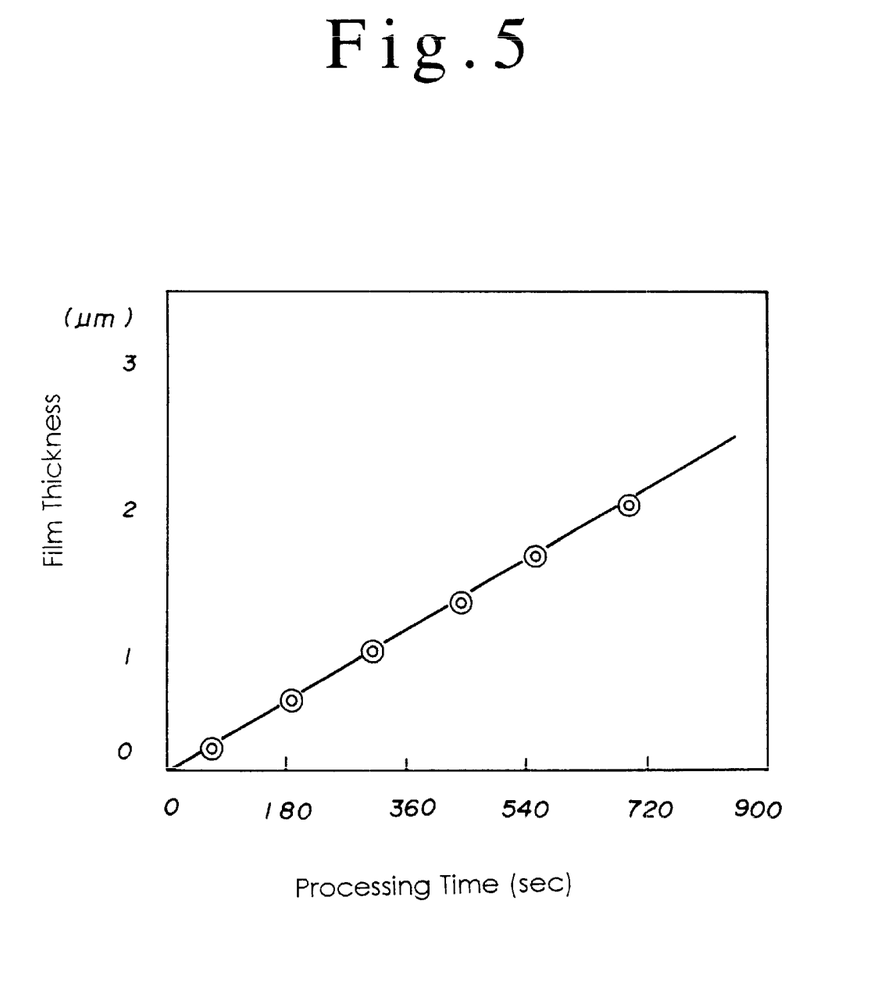
FIG. 5 is a graph showing a film-growing rate of an illustrative nitride coating film.

Furthermore, since five years ago, the inventors of the present invention have conducted certain coating tests on thin coating films deposited using the PVD (Physical Vapor Deposition) method, particularly on titanium and aluminum nitride coating films, and have found, as shown in FIG. 5, that film thickness is freely controllable at a film-growing rate of 3 nm/s, and that the coating film is enabled to completely peel off at room temperature, without causing any damage to the cavity. To form such coating film, a process was employed where ceramic thin coating film of titanium and aluminum nitride having hardness of 1800–2300 Hv was formed on the cavity by means of the sputtering method at a low temperature of 573.15 K (300 degrees C.) in plasma, using titanium and aluminum as target materials, in a PVD apparatus where nitrogen gas was first introduced as a reactive gas.

Therefore, according to a first means or aspect of the present invention employed by the inventors of the present invention, based on a result from those tests, a resin ferrule for use in an optical fiber connector is provided including: a capillary having an axial part; and a flange protruding from the axial part; the ferrule having an optical fiber insertion hole axially passing through the capillary, wherein: the capillary and the flange are integrated into a monolithic structure with thermoplastic resin, and the capillary has a planar-shaped front end surface and a front end part extending towards the front end surface, in a convergent fashion where the front end part has the outer diameter of the radial cross-section thereof reduced along the axial direction thereof towards the front end surface with the cross-section kept concentric, thereby resulting in an advantage in that the ferrule is equipped with a highly increased precision, and the ferrule has its material and working costs greatly reduced.

According to a second means or aspect of the present invention, a die is provided for molding a resin, for use in an optical fiber connector, including: a capillary having an axial part; and a flange protruding from the axial part; the ferrule having an optical fiber insertion hole axially passing through the capillary, the capillary and the flange being integrated into a monolithic structure with thermoplastic resin, the capillary having a planar-shaped front end surface and a front end part extending towards the front end surface, the front end part having the outer diameter of the radial cross-section thereof reduced along the axial direction thereof towards the front end surface with the cross-section kept concentric. The die has portions defining: a first cavity for forming the capillary; a second cavity for forming the flange; a core pin for forming the optical fiber insertion hole; an internal hole pin for forming the front end part of the capillary; and a third cavity for engaging with the internal hole pin; the internal hole pin having a recess part for forming the front end part of the capillary, the recess part being formed on an end surface of the internal hole pin on the side facing the first cavity, the third cavity having an internal circumferential surface, the internal circumferential surface having a coating film, made of aluminum and titanium nitride, formed thereon, the internal hole pin being engaged with the third cavity by having the coating film positioned therebetween, thereby resulting in another advantage in that a die is provided that molds the ferrule of the first means with high precision.

According to a third means or aspect of the present invention, a die is provided for molding a resin ferrule, for use in an optical fiber connector, including: a capillary having an axial part; and a flange protruding from the axial part; the ferrule having an optical fiber insertion hole axially passing through the capillary, the capillary and the flange being integrated into a monolithic structure with thermoplastic resin, the capillary having an insertion opening on an end of the optical fiber insertion hole where an optical fiber is inserted thereinto. The die includes portions defining: a first cavity for forming the capillary; a second cavity for forming the flange; and a core pin for forming the optical fiber insertion hole; where the die provided by the third means has only a ring gate, as a gate, that is disposed on an end surface of the second cavity on the side corresponding to the insertion opening, thereby resulting in a further advantage in that ferrules having an outer diameter of high precision are enabled to be mass produced stably.

According to a fourth means or aspect of the present invention, a die is provided as specified either by the second or third means of the present invention described above, wherein the core pin is integrated into a monolithic structure, whereby the optical fiber insertion hole is made free from any parting marks, resulting in an additional advantage in that the optical fiber is kept free from any damage during the insertion.

Other objects and advantages of the present invention may become more apparent by referring to the following detailed description and accompanying drawings briefly described below.

DETAILED DESCRIPTION

Figure 1:
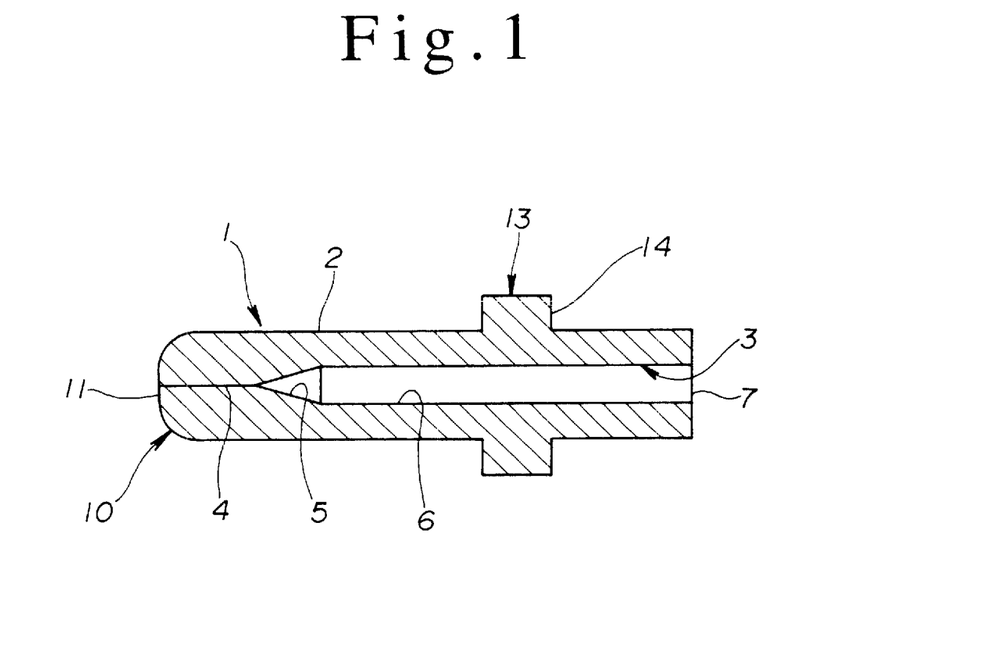
FIG. 1 depicts a longitudinal sectional view showing an illustrative resin ferrule, for use in an optical fiber connector, according to an embodiment of the present invention.

Hereunder, an ferrule for use in an optical fiber connector, according to an illustrative embodiment of the present invention, is described more in detail, referring to FIG. 1, attached hereto.

As shown in FIG. 1, the ferrule is made of a thermoplastic resin including a liquid crystal polymer mixed with a large amount of additives for the purpose of reducing the shrinkage factor, and includes a capillary 1 having an axial part 2, and a flange 13 protruding from the axial part 2, where the capillary 1 and the flange 13 are integrated into a monolithic structure by means of injection molding. An optical fiber insertion hole 3 axially passing through the capillary 1, is formed within the capillary 1. The optical fiber insertion hole 3 includes portions defining a fine hole part 4 passing through the front end part 10 of the capillary 1; a conical hole part 5 having an internal circular conical shape, following the fine hole part 4; and a guide hole part 6 of a large diameter, following the conical hole part 5, wherein the guide hole part 6 opens toward an insertion opening 7 of the optical fiber insertion hole 3. The front end part 10 extends towards the front end surface 11, in a convergent fashion where the outer diameter of the radial cross-section of the front end part 10 is reduced along eh axial direction thereof towards the planar-shaped front end surface 11, with the cross-section thereof being maintained concentric. The convergent shape of reducing the outer diameter of the front end part 10 towards the front end surface 11 is formed into a specific shape, such as a spherical or chamfered shape. The front end part 10 may be formed to have an axial length not more than 1.2 mm, while the fine hole part 4 and the conical hole part 5 together may be formed to have a total axial length not less than 1 mm and not more than 8 mm.

Figure 3:
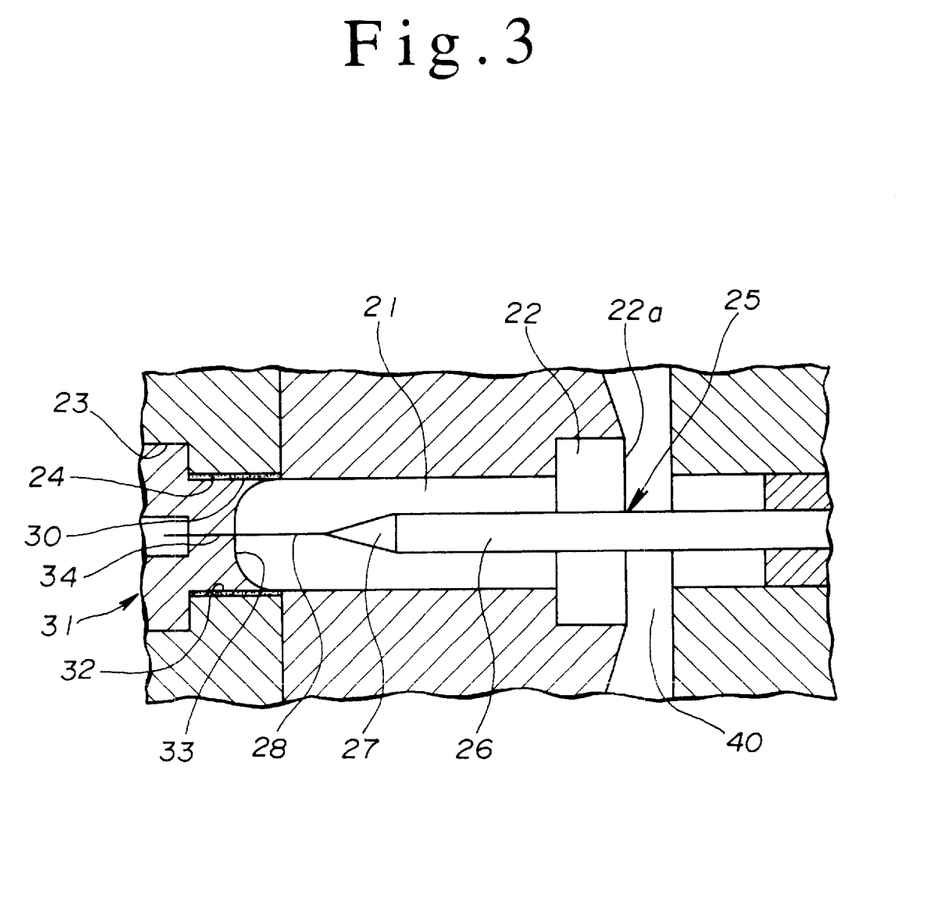
FIG. 3 depicts a partial longitudinal sectional view showing the molding die of FIG. 2, more in detail.

When a die for molding a resin ferrule is fabricated according to the present invention, a ring gate 40 of the molding die, shown in FIG. 3, is connected to an end surface 22a of the second cavity 22 on the side corresponding to the insertion opening 7 of the optical fiber insertion hole 3. Therefore, the ferrule according to the present invention has gate-working marks, or scars, formed only on the flange 13, but not on the capillary 1 at all. Furthermore, while a core pin 25, for forming the optical fiber insertion hole 3, of the molding die has elements constituting a circular column part 26 for forming the guide hole part 6, a conical part 27 for forming the conical hole part 5, and a fine pin part 28 for forming the fine hole part 4, the core pin 25, according to the present invention, employs a monolithic structure such that those members are formed to be integrated into the monolithic structure. Therefore, the conical hole part 5 of the optical fiber insertion hole 3 of the capillary 1 is formed to have an internal surface thereof completely free from any parting marks.

Figure 2:
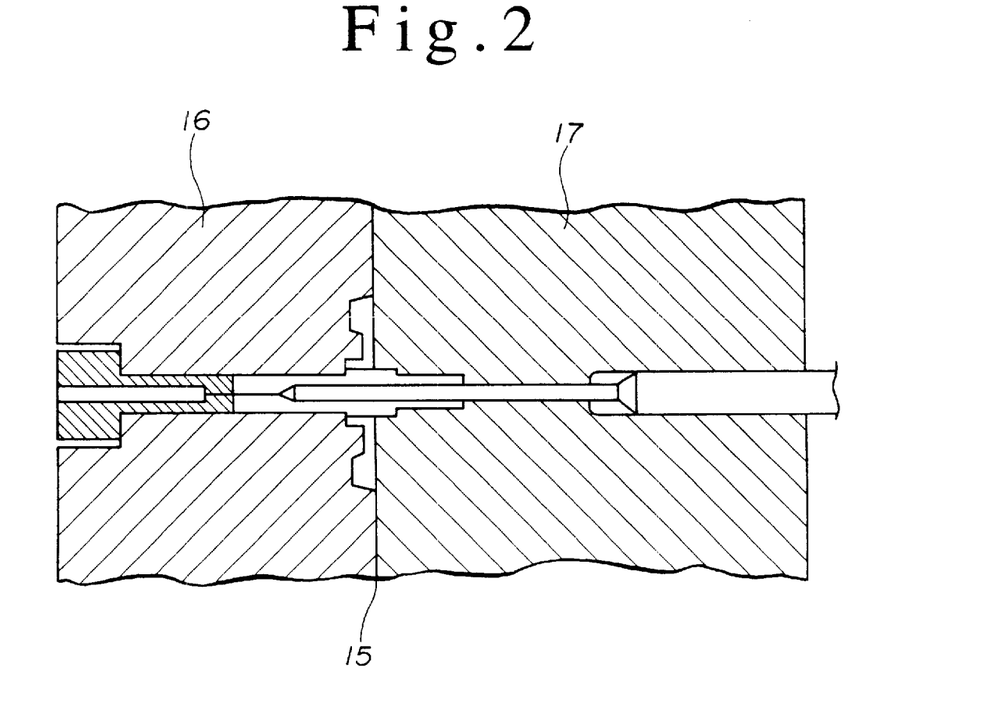
FIG. 2 depicts a schematic longitudinal sectional view showing an illustrative die for molding the resin ferrule of FIG. 1.
Figure 4A:
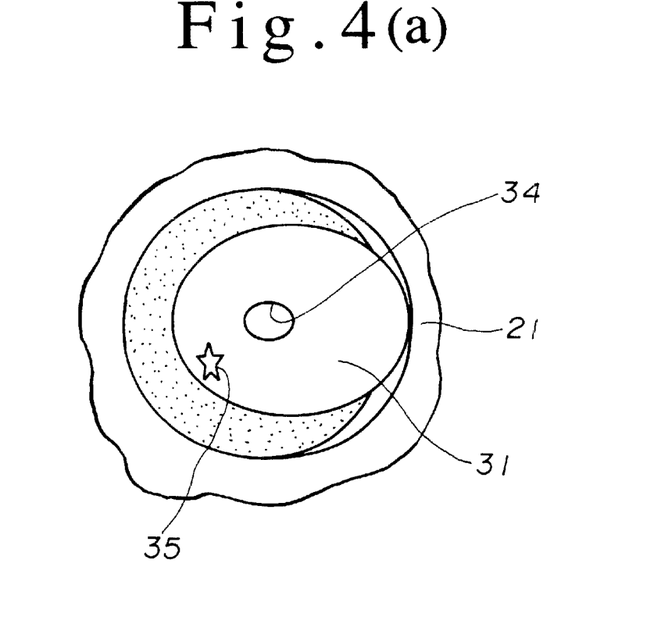
FIG. 4(a) and (b) depict two schematic radial cross-sectional views respectively showing states of nitride coating films formed, where FIG. 4(a) refers to one aspect and FIG. 4(b) to another aspect of the states.
Figure 4B:
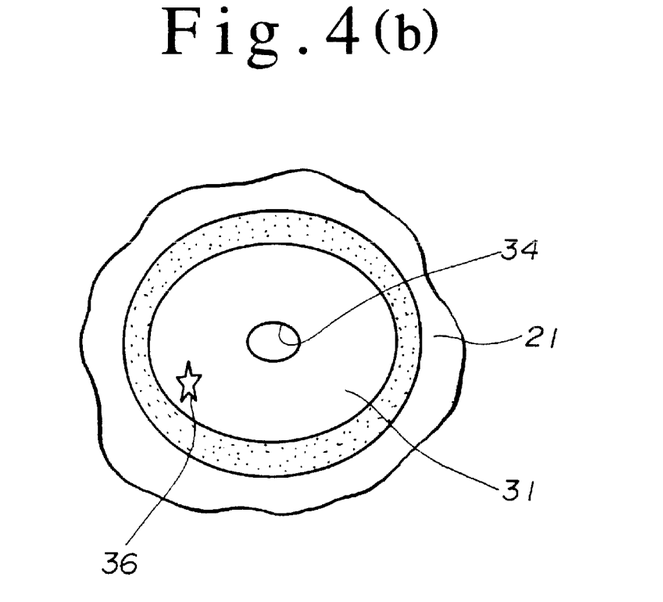

Next, a die for forming a resin ferrule for use in an optical fiber connector, according to an illustrative embodiment of the present invention, is described more in detail, referring to FIGS. 2–4, attached hereto.

As shown in FIG. 2, this die has a stationary part 16 fixed to the injection molding machine and a moving part 17 movable in parallel with respect to the stationary part 16, and separable therefrom at a parting line 15. As shown in FIG. 3, this die has portions defining: a first cavity 21 including an internal circular cylindrical surface for forming the capillary 1 of the ferrule, described above; a second cavity 22 including an internal circular cylindrical surface of a large inner diameter for forming the flange 13 of the ferrule; an internal hole pin 31 for forming the front end part 10 of the capillary 1; and a third cavity 23 communicating with the first cavity 21 for engaging with the internal hole pin 31. The third cavity 23 has an internal circumferential surface 24 for engaging with the internal hole pin 31. The internal hole pin 31 has an engaging part 32 of a circular column shape for engaging with the third cavity 23.

A coating film 30, made of aluminum and titanium nitride, is formed on the internal circumferential surface 24. This coating film 30 is formed by means of a deposition using the PVD method described above. The internal hole pin 31 is engaged with the third cavity 23 by engaging the engaging part 32 of the internal hole pin 31 with the internal circumferential surface 24 of the third cavity 23 with the coating film 30 positioned between the internal circumferential surface 24 and the engaging part 32. The internal hole pin 31 has a recess part 33, for forming the front end part 10 of the capillary 1, described above, formed on an end surface of the engaging part 32 of the internal hole pin 31 on the side facing the first cavity 21. The recess part 33 has a shape such that the recess part 33 has a planar-shaped bottom part, and has the internal circumferential surface thereof extending towards the open end thereof facing one end of the cavity 21, in a divergent fashion. The recess part 33 has the outer diameter of the radial cross-section thereof increased along the axial direction thereof towards the open end thereof with the cross-section being maintained concentric. The internal hole pin 31 has a pin hole 34 in the center of the recess part 33 of the engaging part 32 thereof.

The core pin 25 for forming the optical fiber insertion hole 3, is inserted into the first cavity 21 form the side corresponding to the insertion opening 7 of the optical fiber insertion hole 3 of the ferrule. Specifically, the core pin 25 has the fine pin part 28 inserted into the pin hole 34 in the center of the recess part 33 of the engaging part 32 of the internal hole pin 31. The titanium and aluminum nitride coating film 30 is formed on the internal circumferential surface 24 of the third cavity 23, non-uniformly or uniformly, depending on the position of the pin hole 34 of the internal hole pin 31, so that the first cavity 21, the core pin 25, and the pin hole 34 of the internal hole pin 31 are made coaxial with each other, as shown in FIGS. 4(a) and 4(b), respectively. With this arrangement, the core pin 25 may be enabled to be inserted into the pin hole 34 without breaking the front end part of the core pin 25 even when the gap between the core pin 25 and the pin hole 34 of the internal hole pin 31 is 1 μm or less. Preferably, matchmarks 35, 36 may be attached on the first cavity 21, the third cavity 23, and the internal hole pin 31 to correlate them with each other so that the internal hole pin 31 is enabled to be inserted back in the same position as before, in case of re-insertion after removal of the internal hole pin 31.

Then, the ring gate 40 is connected to the end surface 22a of the second cavity 22 of the molding die on the side corresponding to the insertion opening 7 of the optical fiber insertion hole 3, as described above. The ring gate 40 may be formed to have an axial width not less than 0.4 mm and not more than 1.25 mm.

Description of Certain Illustrative Embodiments

Next, certain embodiments according to the present invention will be described based on some comparison tests.

Illustrative Embodiment 1

Employing the injection molding die described above referring to FIG. 3, some sample ferrules for use in optical fiber connectors were molded with a thermoplastic resin, illustratively a liquid crystal polymer mixed with a large amount of additives for the purpose of reducing the shrinkage factor, where the axial length of the front end part 10 of the capillary 1 of the ferrule was 0.5 mm. Fluctuation of the outer diameter of the capillary 1 was measured at four positions on the axial part 2 of the capillary 1 except the front end part 10, as the axial width of the ring gate 40 in the injection molding die of FIG. 3 was varied. The result from the measurement for the fluctuation is shown in Table 1, below.

TABLE 1

| [Ring Gate Width] | 0.3 mm | 0.6 mm | 1.25 mm |
|---|---|---|---|
| [Near the Front End Part] | 2.487 mm | 2.500 mm | 2.501 mm |
| [1.5 mm from the Front End Part] | 2.480 mm | 2.498 mm | 2.498 mm |
| [Central Part] | 2.484 mm | 2.499 mm | 2.499 mm |
| [Near the Flange] | 2.484 mm | 2.499 mm | 2.499 mm |
| [Fluctuation] | 0.007 mm | 0.002 mm | 0.003 mm |

From the result of the tests above, it is known that the outer diameter of the capillary 1 of the ferrule is stabilized when the ring gate 40 is connected to the end surface 22a of the second cavity 22 on the side corresponding to the insertion opening 7 of the optical fiber insertion hole 3, with the axial width of the gate 40 set at 0.4 mm or greater.

Roundness of the capillary 1 of the ferrule was also measured, which result is shown in Table 2 below.

TABLE 2

| [Ring Gate Width] | 0.3 mm | 0.6 mm | 1.25 mm |
|---|---|---|---|
| [1.5 mm from the Front End Part] | 1.2 μm | 0.3 μm | 0.4 μm |
| [Central Part] | 1.5 μm | 0.6 μm | 0.5 μm |
| [Near the Flange] | 0.9 μm | 0.5 μm | 0.5 μm |
| [Average Value] | 1.2 μm | 0.47 μm | 0.47 μm |

From the result of the tests above, it is known that the roundness of the capillary 1 of the ferrule has an average value of 0.5 μm when the ring gate 40 is connected to the end surface 22a of the second cavity 22 on the side corresponding to the insertion opening 7 of the optical fiber insertion hole 3, with the axial width of the gate 40 set at 0.4 mm or greater. In designing, a 3-D resin flow analysis program was used.

Illustrative Embodiment 2

In the case of Embodiment 1, while the outer diameter of the capillary 1 was 1.75 mm, and the axial length of the front end part 10 having a convergent shape of reducing the outer diameter of the front end part 10 towards the front end surface 11 was 0.5 mm, the front end part 10 of the capillary 1 exhibited a trumpet-like expansion even when the axial width of the ring gate 40 was, e.g., 0.6 mm. Thus, the fluctuation of the outer diameter of the capillary 1 was measured with the axial length of the front end part of the capillary 1 set at 1.0 mm, with the axial width of the ring gate 40 kept at 0.6 mm, as Embodiment 2, which result is shown in Table 3 below, in comparison with the result with the axial length of the front end part of the capillary 1 set at 0.5 mm.

TABLE 3

| [Axial Length of the Front End Part] | 0.5 mm | 1.0 mm |
|---|---|---|
| [Near the Front End Part] | 2.500 mm | 2.499 mm |
| [1.5 mm from the Front End Part] | 2.498 mm | 2.498 mm |
| [Central Part] | 2.499 mm | 2.499 mm |
| [Near the Flange] | 2.499 mm | 2.499 mm |
| [Fluctuation] | 0.002 mm | 0.001 mm |

Figure 6:
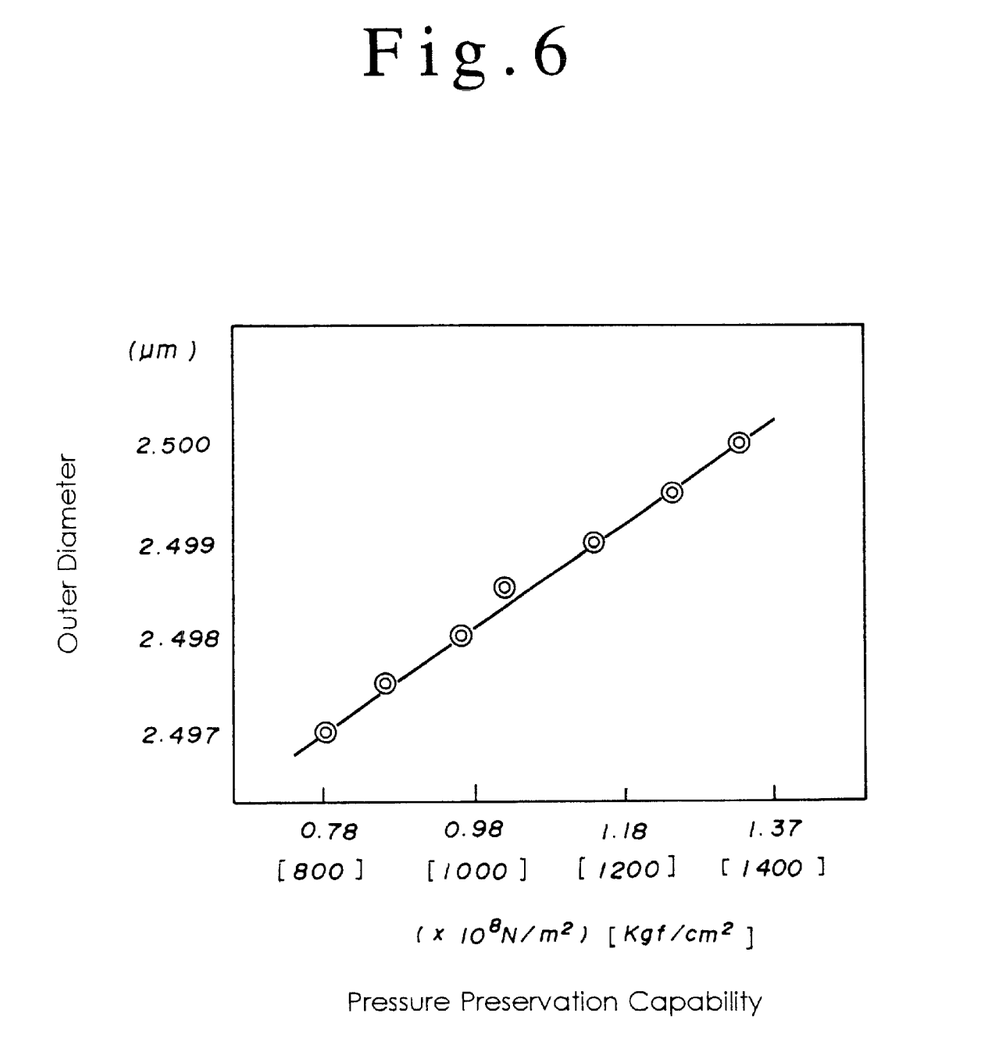
FIG. 6 is a graph showing a relation between the outer diameter of a ferrule and the pressure preservation capability of resin.

As described earlier, it has been known that, when a ring gate is employed, the outer diameter of the capillary of thermoplastic resin ferrules is correlated with the axial width of the gate, and the pressure preservation capability of high pressure during the molding, and that the specified outer diameter can be obtained by freely setting these correlated factors. For example, a relation between the outer diameter of a capillary and the pressure preservation capability of resin, with the axial width of the ring gate set at 0.6 mm, is shown in FIG. 6.

From those test results, it is known that high precision outer diameters of the axial part 2 of the capillary 1 may be obtained by using a thermoplastic resin, illustratively a liquid crystal polymer mixed with a large amount of additives for the purpose of reducing the shrinkage factor, under the condition that a ring gate 40 is connected to the end surface 22a of the second cavity 22 on the side corresponding to the insertion opening 7 of the optical fiber insertion hole 3, with the axial width of the gate 40 set at not less than 0.4 mm and not more than 1.25 mm, and the front end part 10 extending towards the front end surface 11 has a convergent shape where the front end part 10 has the outer diameter of the radial cross-section thereof reduced along the axial direction thereof towards the front end surface 11 with the cross-section kept concentric, and with the axial length of the front end part 10 set at 1.2 mm or less.

Illustrative Embodiment 3

An injection molding die according to an embodiment of the present invention is described hereunder, that enables to adjust the pin hole 34 of the internal hole pin 31 to be coaxial with the axial part 2 of the capillary 1, or, in other words, coaxial with the first cavity 21, by forming titanium and aluminum nitride coating film 30, non-uniformly or uniformly as required, on the internal circumferential surface 24 of the third cavity 23, where the core pin 25 is inserted, using the PVD method, and by engaging the internal hole pin 31 with the internal circumferential surface 24 of the third cavity 23, with the coating film positioned between the internal hole pin 31 and the internal circumferential surface 24 of the third cavity 23.

This molding die is the same die as used in the Embodiments 1 and 2 and shown in FIG. 3. The core pin 25 for forming the optical fiber insertion hole 3, is inserted into the first cavity 21 from the side corresponding to the insertion opening 7 of the optical fiber insertion hole 3 of the ferrule. Specifically, the core pin 25 has the fine pin part 28 inserted into the pin hole 34 in the center of the recess part 33 of the engaging part 32 of the internal hole pin 31. The concentricity of the axial part 2 of the capillary 1 with the optical fiber insertion hole 3 of the capillary 1, as a finished product, has been improved by properly varying the radial thickness of the titanium and aluminum nitride coating film 30, formed on the internal circumferential surface 24 of the third cavity 23 using the PVD method, within the gap occurring when the internal hole pin 31 is engaged, as shown in FIGS. 4(a) and 4(b). Preferably, position-aligning matchmarks 35, 36 may be attached on the first cavity 21, the third cavity 23, and the internal hole pin 31 to correlate them with each other so that the internal hole pin 31 is enabled to be inserted back in the same position as before, without dislocation in the circumferential direction, in case of reassembling the internal hole pin 31 into the third cavity 23. The concentricity of the pin hole 34 of the internal hole pin 31 with the fine pin part of the core pin 25 was measured with ferrules that were molded using a thermoplastic resin, illustratively a liquid crystal polymer mixed with a large amount of additives for the purpose of reducing the shrinkage factor, by means of the molding die fabricated as described above. A result from the measurement is shown in Table 4, from which it is known that, with this arrangement of adjusting the concentricity by properly forming the coating film 30, made of titanium and aluminum nitride, the fine pin part 28 of the core pin 25 may be enabled to be inserted into the pin hole 34 of the internal hole pin 31 smoothly without any breakage even when the gap between the fine pin part 28 of the core pin 25 and the pin hole 34 of the internal hole pin 31 is 1 $\mu$m.

TABLE 4

| | [Coating Film Not Used] | [Coating Film Used] |
|---|---|---|
| [Concentricity] | 1.5 $\mu$m | 0.7 $\mu$m |

It has been also known that the coating film 30, made of titanium and aluminum nitride, is enabled to completely peel off at room temperature by using peeling agent, without causing any damage to the third cavity 23. Therefore, this third cavity 23 can be re-used by re-coating the internal circumferential surface 24 of the internal hole pin 31 with the titanium and aluminum nitride after the previous coating film has been removed or peeled off.

As described above, a resin ferrule for use in an optical fiber connector, according to the present invention, has the capillary and the flange thereof integrated into a monolithic structure with thermoplastic resin, where the capillary has a planar-shaped front end surface and a front end part extending towards the front end surface, in a convergent fashion where the front end part has the outer diameter of the radial cross-section thereof reduced along the axial direction thereof towards the front end surface with the cross-section kept concentric. Also, as described above, a die for molding such a resin, according to the present invention, has an internal hole pin for forming the front end part of the capillary, a third cavity for engaging with the internal hole pin, and a core pin, for forming the optical fiber insertion hole, integrated into a monolithic structure, where the third cavity includes an internal circumferential surface having a coating film, made of aluminum and titanium nitride, formed thereon, the internal hole pin being engaged with the third cavity by having the coating film positioned therebetween, where die has only a ring gate, as a gate, that is disposed on an end surface of the second cavity on the side corresponding to the insertion opening of the optical fiber insertion hole.

Thus, with arrangement for a resin ferrule and a molding die therefor, as described above, according to the present invention, various advantages are obtained as shown below.

A resin ferrule, according to the present invention, molded using thermoplastic resin of low shrinkage factor (e.g., liquid crystal polymer) may be obtained that is advantageously equipped with high precision characteristics, most important for a ferrule, such as an outer diameter tolerance of (+/−) 0.7 $\mu$m, a roundness of 0.45 $\mu$m or less, and an eccentricity of 1.0 $\mu$m or less. Also, because the optical fiber insertion hole is made free from any parting marks, the optical fiber is advantageously kept free from any damage during the insertion.

The conventional molding dies, for high precision products, such as ferrules, are obtained by repeating processes of new fabrications and re-working based on the ferrule dimensions data, thereby costing very high and taking many fabrication days. On the contrary, the molding dies of the present invention may enable higher cost-effectiveness and greater performance than the conventional dies because the molding dies of the present invention has a high-hardness titanium and aluminum nitride coating film, capable of peeling off and re-forming, formed on the internal circumferential surface of a cavity of the die by means of the PVD method, which in turn enables to eliminate processes of new fabrications and re-working of cavities.

While a resin ferrule according to the present invention has its molding die equipped with a ring gate having a very large axial width for enabling high precision ferrule dimensions, the gate is positioned on an end surface on the side corresponding to the insertion opening of the optical fiber insertion hole, by taking into consideration application of a machine-working process to the gate. Because of this arrangement and because of another fact that the capillary does not require working at all, automated working of a ferrule, or a gate, is made feasible, whereby a resin ferrule according to the present invention can be advantageously provided at cost lower than a conventional ceramic ferrule.

The present invention is not limited to applications to resin ferrules and molding die therefor, but also is applicable to products of extremely general use, particularly requiring high molding die precision, and to products using thermoplastic resin having flow characteristics deteriorated due to a large amount of additives mixed therein for the purpose of reducing the shrinkage factor.

While there have been shown and described fundamental novel features of the present invention as applied to illustrative embodiments thereof, it will be understood that the present invention is not limited by the embodiments described above, and various modifications and changes to such embodiments may be made by those skilled in the art without departing from the spirit of the invention. It is our intention, therefore, to be limited only as indicated by the scope of the claims appended hereto.

Reference symbols and numbers used in describing claims attached hereto are intended only for the purpose of having the present invention better understood, and therefore should not be interpreted as limiting the scope of the present invention in any way.

What is claimed is:

1. A resin ferrule for use in an optical fiber connector which comprises:

a capillary having a front end portion, an axial portion extending from said front end portion and a flange protruding from said axial portion, said capillary and said flange being integrated into a thermoplastic resinous structure;

an optical fiber insertion hole concentrically disposed within said capillary, said optical fiber insertion hole containing a fine hole portion extending through the front end portion, a conical hole portion following said fine hole portion and disposed within said axial portion and a guide hole portions following said conical hole portion; and said front end portion having an outer diameter of the radial cross-section thereof gradually reduced in the axial direction thereof, converging to a planar-shaped front end surface, said front end portion having an axial length of not more than 1.2 mm, and said fine hole portion and said conical hole portion together having a total axial length of not less than 1 mm and not more than 8 mm.

2. A resin ferrule according to claim 1, wherein the front end portion has an axial length not less than 0.5 mm.

3. A resin ferrule according to claim 1, wherein the front end portion is spherical.

4. The resin ferrule according to claim 3, wherein:

the conical hole portion is formed so that the internal surface of said conical hole portion has no parting marks thereon.

* * * * *